US010198984B2

(12) United States Patent
Levin et al.

(10) Patent No.: US 10,198,984 B2
(45) Date of Patent: Feb. 5, 2019

(54) DISPLAY PANEL CALIBRATION USING DETECTOR ARRAY MEASUREMENT

(71) Applicant: Facebook Technologies, LLC, Menlo Park, CA (US)

(72) Inventors: Kieran Tobias Levin, Redwood City, CA (US); Simon Hallam, San Jose, CA (US); Ye Yin, Pleasanton, CA (US); Evan M. Richards, Santa Clara, CA (US); Shizhe Shen, San Mateo, CA (US)

(73) Assignee: Facebook Technologise, LLC, Menlo Park, CA (US)

( * ) Notice: Subject to any disclaimer, the term of this patent is extended or adjusted under 35 U.S.C. 154(b) by 13 days.

(21) Appl. No.: 15/476,772

(22) Filed: Mar. 31, 2017

(65) Prior Publication Data

US 2018/0286298 A1 Oct. 4, 2018

(51) Int. Cl.
*G01J 3/46* (2006.01)
*G09G 3/20* (2006.01)

(52) U.S. Cl.
CPC ... *G09G 3/2003* (2013.01); *G09G 2320/0626* (2013.01); *G09G 2320/08* (2013.01)

(58) Field of Classification Search
CPC ......... G09G 3/2003; G09G 2320/0626; G09G 2320/08; G09G 3/00; G09G 3/30; G09G 3/32; G09G 3/34; G09G 3/36; G09G 3/3225; G09G 5/10; A61B 6/00; A61B 6/03; A61B 6/54; A61B 6/032; A61B 6/4233; H04N 13/00; H04N 17/00; G02B 27/01
See application file for complete search history.

(56) References Cited

U.S. PATENT DOCUMENTS

2006/0071886 A1 * 4/2006 Johnson ............... G09G 3/3216 345/77

* cited by examiner

*Primary Examiner* — Jamil Ahmed
(74) *Attorney, Agent, or Firm* — Fenwick & West LLP

(57) ABSTRACT

A system calibrates luminance of an electronic display panel. The system includes a luminance detection device, an actuator and a computing device. The luminance detection device comprises a plurality of detectors arranged along a width or length of the electronic display panel to simultaneously measure luminance parameters of at least one row or column of areas in the electronic display panel. Each of the plurality of detectors covers an area in the at least one row or column of the electronic display panel. The actuator is configured to cause a relative translational movement in a length direction or a width direction of the electronic display panel. The computing device is coupled to the luminance detection device to receive the measured luminance parameters, and the computing device is configured to generate calibration data for adjusting brightness of areas of the electronic display panel by processing the measured luminance parameters.

20 Claims, 9 Drawing Sheets

DISPLAY PANEL CALIBRATION USING DETECTOR ARRAY MEASUREMENT

BACKGROUND

The present disclosure generally relates to display panels, and specifically to calibrating brightness and colors in such display panels using detector array measurement.

An electronic display panel includes pixels that display a portion of an image by emitting one or more wavelengths of light from various sub-pixels. When input indicating the same brightness across all pixels is received, the electronic display panel should display the same luminance across its entire surface. However, various variances during the manufacturing process cause non-uniformities in luminance of pixels and sub-pixels. For example, variations in flatness of a carrier substrate, variations in a lithography light source, temperature variations across the substrate, or mask defects may result in the electronic display panel having transistors with non-uniform emission characteristics.

As a result, different sub-pixels driven with the same voltage and current will emit different intensities of light (also referred to as brightness). In another example, "Mura" artifact or other permanent artifact causes static or time-dependent non-uniformity distortion in the electronic display panel, due to undesirable electrical variations (e.g., differential bias voltage or voltage perturbation). Variations that are a function of position on the electronic display panel cause different display regions of the electronic display panel to have different luminance. If these errors systematically affect sub-pixels of one color more than sub-pixels of another color, then the electronic display panel has non-uniform color balance as well.

These spatial non-uniformities of brightness and colors decrease image quality and limit applications of the electronic display panels. For example, virtual reality (VR) systems typically include an electronic display panel that presents virtual reality images. These spatial non-uniformities degrade user experience and immersion in a VR environment.

SUMMARY

A system calibrates luminance parameters of an electronic display panel using detector array measurements. The system may calibrate luminance parameters of the electronic display panel by causing a relative translational movement in a length direction or a width direction of the electronic display panel in a rolling manner.

In some embodiments, the system includes a luminance detection device, an actuator and a computing device. The luminance detection device may include a plurality of detectors arranged along a width or length of the electronic display panel to simultaneously measure luminance parameters of at least one row or column of areas in the electronic display panel. Each of the plurality of detectors covers an area in the at least one row or column of the electronic display panel. The actuator causes a relative translational movement in a length direction or a width direction of the electronic display panel. The computing device is coupled to the luminance detection device to receive the measured luminance parameters, and the computing device generates calibration data for adjusting brightness of areas of the electronic display panel by processing the measured luminance parameters.

Figure 1A:
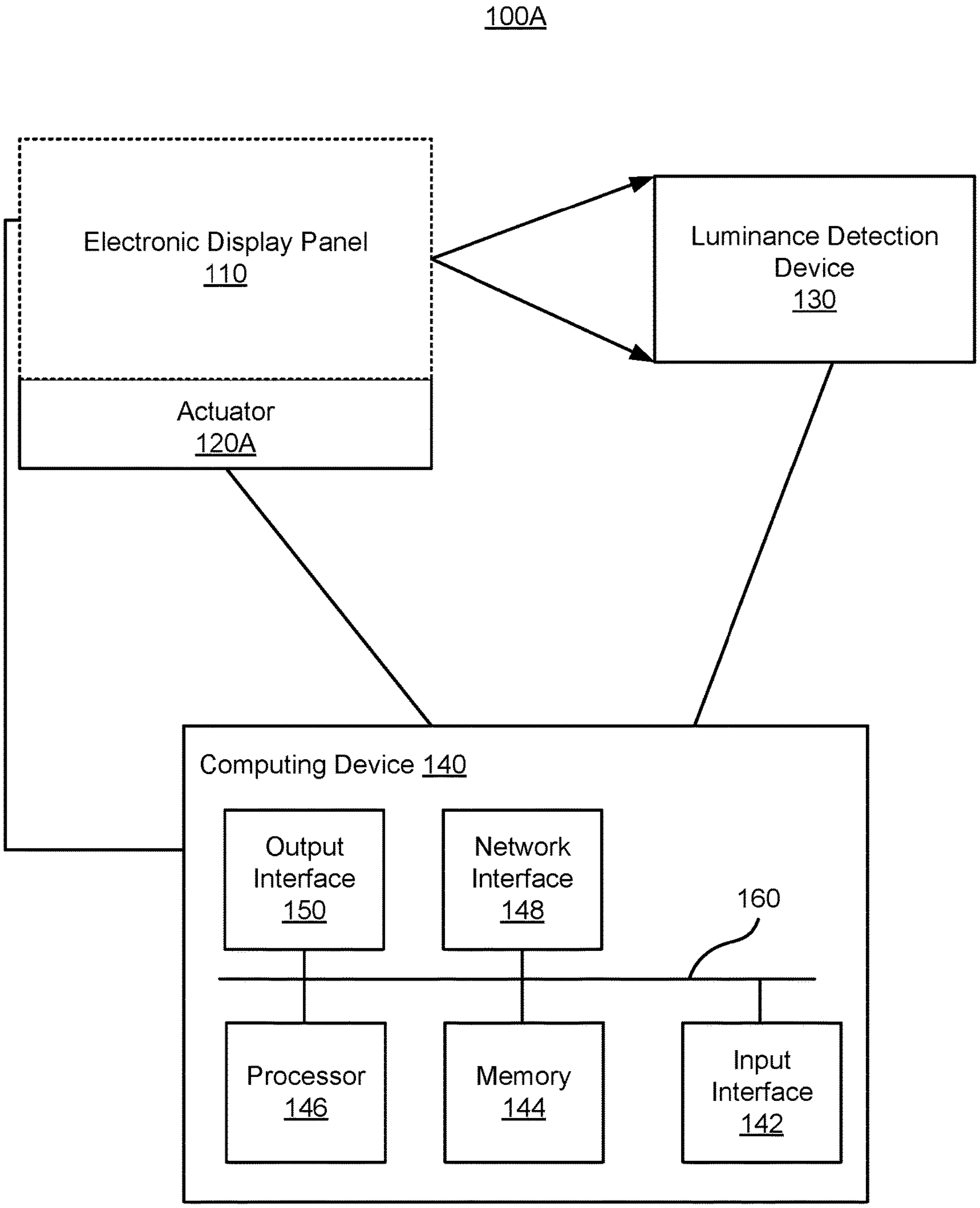
FIG. 1A is a high-level block diagram illustrating an embodiment of a system for calibrating luminance of an electronic display panel, in accordance with an embodiment.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

The figures use like reference numerals to identify like elements. A letter after a reference numeral, such as "120A," indicates that the text refers specifically to the element having that particular reference numeral. A reference numeral in the text without a following letter, such as "120," refers to any or all of the elements in the figures bearing that reference numeral (e.g. "actuator 120" in the text refers to reference numerals "actuator 120A" and/or "actuator 120B in the figures).

Overall Architecture of Example Calibrating System

FIG. 1A is high-level block diagrams illustrating a system 100A for calibrating luminance of an electronic display panel 110, in accordance with an embodiment. The system 100A includes an actuator 120A, a luminance detection device 130 and a computing device 140. While FIG. 1A shows an example system 100A including one actuator 120A, one luminance detection device 130 and one computing device 140, in other embodiments any number of these components may be included in the system 100A. For example, there may be multiple actuators 120A coupled to the electronic display panel 110 and/or multiple luminance detection devices 130 coupled to one or more computing devices 140. In alternative configurations, different and/or additional components may be included in the system 100A. Similarly, the functionality of one or more of the components can be distributed among the components in a different manner than is described here.

The actuator 120 is an apparatus that causes a relative translational movement in a length direction or a width direction of the electronic display panel 110. The actuator 120 may be an electromechanical actuator (e.g., an electrostatic actuator and an electromagnetic actuator). The relative translational movement is in a direction that is orthogonal to a direction in which the luminance detection device 130 extends.

In the embodiment of FIG. 1A, the actuator 120A moves the electronic display panel 110 in a length direction or a width direction of the electronic display panel 110. The actuator 120A may be placed on various locations coupled to the electronic display panel 110. For example, the actuator 120A may be located proximal to an edge of the electronic display panel 110, underneath the electronic display panel 110, on top of the electronic display panel 110, or some at some other locations. In some embodiments, the actuator 120A may be coupled to a holder (not shown in FIG. 1A) that holds the electronic display panel 110. In another example, an actuator 120B makes translational movement of the luminance detection device 130 in a length direction or a width direction of the electronic display panel 110, as described below with respect to FIG. 1B.

The luminance detection device 130 measures luminance parameters of at least one row or column of areas in the electronic display panel 110. Examples of an area may include a pixel, a sub-pixel, a group of sub-pixels, or a group of pixels. The luminance parameters describe parameters associated with an area of the electronic display panel 110. Examples of the luminance parameters associated with the area may include a brightness level, a color value, or both. The brightness level of an area represents an overall light intensity of the area. The color value of an area is represented by a combination of brightness levels of sub-pixels of the area. In some embodiments, the luminance detection device 130 measures luminance parameters of one row or column of areas in the electronic display panel 110, as described below with respect to FIGS. 2A through 2C, 3A, 3B, 6A and 6B. Alternatively, the luminance detection device 130 measures luminance parameters of multiple rows or columns of areas in the electronic display panel 110, as described below in detail with respect to FIGS. 4A through 5E.

In some embodiments, the luminance detection device 130 includes a plurality of band-pass filters (not shown) between the electronic display panel 110 and sensors of the luminance detection device 130. Each band-pass filter passes light within a predetermined range of wavelengths (e.g., red light, green light or blue light). The luminance detection device 130 includes a sensor (not shown) for receiving light emitted from the electronic display panel 110. For example, a sensor of the photo-detector is a sensing component that light is incident on.

The computing device 140 controls the actuator 120, and the luminance detection device 130 for calibrating the electronic display panel 110. Additionally and/or alternatively, the computing device 140 controls the electronic display panel 110. For example, the computing device 140 generates commands to instruct the actuator 120 to cause a relative translational movement in a length direction or a width direction of the electronic display panel 110. The computing device 140 generates commands to instruct the luminance detection device 130 to simultaneously measure luminance parameters of at least one row or column of areas in the electronic display panel 110.

Further, the computing device 140 receives the measured luminance parameters from the luminance detection device 130 and generates calibration data for adjusting brightness of areas of the electronic display panel 110 by processing the received measured luminance parameters. In some embodiments, a calibration process involves providing known (e.g., predetermined) and uniform input to the electronic display panel 110. A uniform input may be, e.g., instructions for the electronic display panel 110 to emit a white image with equal brightness levels for each individual pixel. The predetermined input includes predetermined luminance parameters, e.g., brightness level and color value for each individual sub-pixel in a pixel, brightness level and color value for each individual pixel, or some combination thereof. The computing device 140 determines calibration data based on differences between the measured luminance parameters of areas and corresponding predetermined luminance parameters.

The calibration data describes data associated with one or more adjustments (e.g., brightness adjustment, color adjustment, or both) of luminance parameters of the areas. An adjustment adjusts a luminance parameter of one or more areas such that the corresponding luminance parameter of the one or more areas is within a range of luminance parameters (e.g., a range of brightness levels, or a range of color values, or both). The determined calibration data may include a correction voltage for adjusting a change in a drive voltage of the TFT. In some embodiments, the computing device 140 calibrates the electronic display panel 110 based on luminance parameters measured by the luminance detection device 130 at a sub-pixel level. For example, the computing device 140 generates commands to instruct the electronic display panel 110 to display sub-pixels with the same color (e.g., red sub-pixels, green sub-pixels, or blue sub-pixels). After obtaining the calibration data, the computing device 140 updates the electronic display panel 110 with the determined calibration data so that the calibration data can be applied during the normal use of the electronic display panel 110.

Example Computing Device

As shown in FIG. 1A, the computing device 140 includes an input interface 142, a memory 144, a processor 146, a network interface 148, an output interface 150, and a bus 160 connecting each of these components. In alternative configurations, fewer, different and/or additional components may also be included in the computing device 140, such as drivers (e.g., gate drivers, and/or source drivers) to drive sub-pixels, and a controller (e.g., a timing controller) to receive display data and to control the drivers.

The input interface 142 may be any user input device including a touch-screen, a pointing device and a keyboard.

In some embodiments, the computing device 140 may be configured to receive input (e.g., commands) from the input interface 142 from a user.

The memory 144 stores information instructions for operating the actuator 120A and the luminance detection device 130.

The processor 146 controls the actuator 120 and the luminance detection device 130. For example, as shown in FIG. 1A, the processor 146 generates commands to instruct the actuator 120A to make translational movement of the electronic display panel 110 in a length direction or a width direction of the electronic display panel 110. The processor 146 generates commands to instruct luminance detection device 130 to measure luminance parameters of at least one row or column of areas in the electronic display panel 110.

In some embodiments, the processor 146 controls operation of the actuator 120. For example, as shown in FIG. 1A, the processor 146 instructs the actuator 120A to make translational movement of the electronic display panel 110 in a rolling manner such that no two areas in one row or column are below each of the plurality of detectors in the luminance detection device 130, over the same time period. Making translational movement of the electronic display panel 110 in a rolling manner allows each row or column to be individually measured and allows each area in a corresponding row or column to be individually measured. Such rolling manner allows the use of one-dimensional detector array or multiple detector arrays for fast acquisition with a low computational complexity and cost, and for more accurate calibration without light interference from other areas.

The output interface 150 is a component for providing the result of computation in various forms (e.g., text, image, or audio signals). For example, the output interface 150 may be a display that depicts the calibration data. The network interface 148 enables the computing device 140 to communicate with the electronic display panel 110, the actuator 120A, the luminance detection device 130, an external source (not shown in FIG. 1A) and/or other computing devices 140 through a network.

During the calibration operation, the actuator 120A is operated by the processor 146 to move the electronic display panel 110 to an initial position. Then the luminance detection device 130 is operated to measure luminance parameters of at least one row or column of the electronic display panel 110. The actuator 120A is then operated by the processor 146 to move the luminance detection device 130 to a second position. If the luminance detection device 130 measures first three rows (e.g., the first, the second and the third row) at the initial position, the second position of the luminance detector 130 will be set to detect the next three rows. Then the luminance detection device 130 measures luminance parameters at the second position. The moving and measuring processes are repeated until the luminance detection device 130 measures all the rows or columns of the electronic display panel 110.

The calibration data may be determined based on differences between the measured luminance parameters of each of the areas and corresponding predetermined luminance parameters. For example, the processor 146 retrieves predetermined luminance parameters and measured luminance parameters of each of the areas stored in the memory 144, compares the measured luminance parameters of each of the areas with corresponding predetermined luminance parameters, calculates differences between the measured luminance parameters of each the areas and corresponding predetermined luminance parameters and then determines the calibration data based on the calculated differences. For example, for each of the areas, the processor 146 determines a correction drive voltage of the TFT that drives a corresponding area to reduce the difference within an acceptable range.

The calibration data may be in the form of a calibration LUT based on determined calibration data for the areas in the electronic display panel 110. The created calibration LUT includes measured luminance parameters of an individual area, predetermined luminance parameters of corresponding areas, and correction factors associated with the luminance parameters of corresponding areas. The created calibration LUT may be stored in the electronic display panel 110.

Figure 1B:
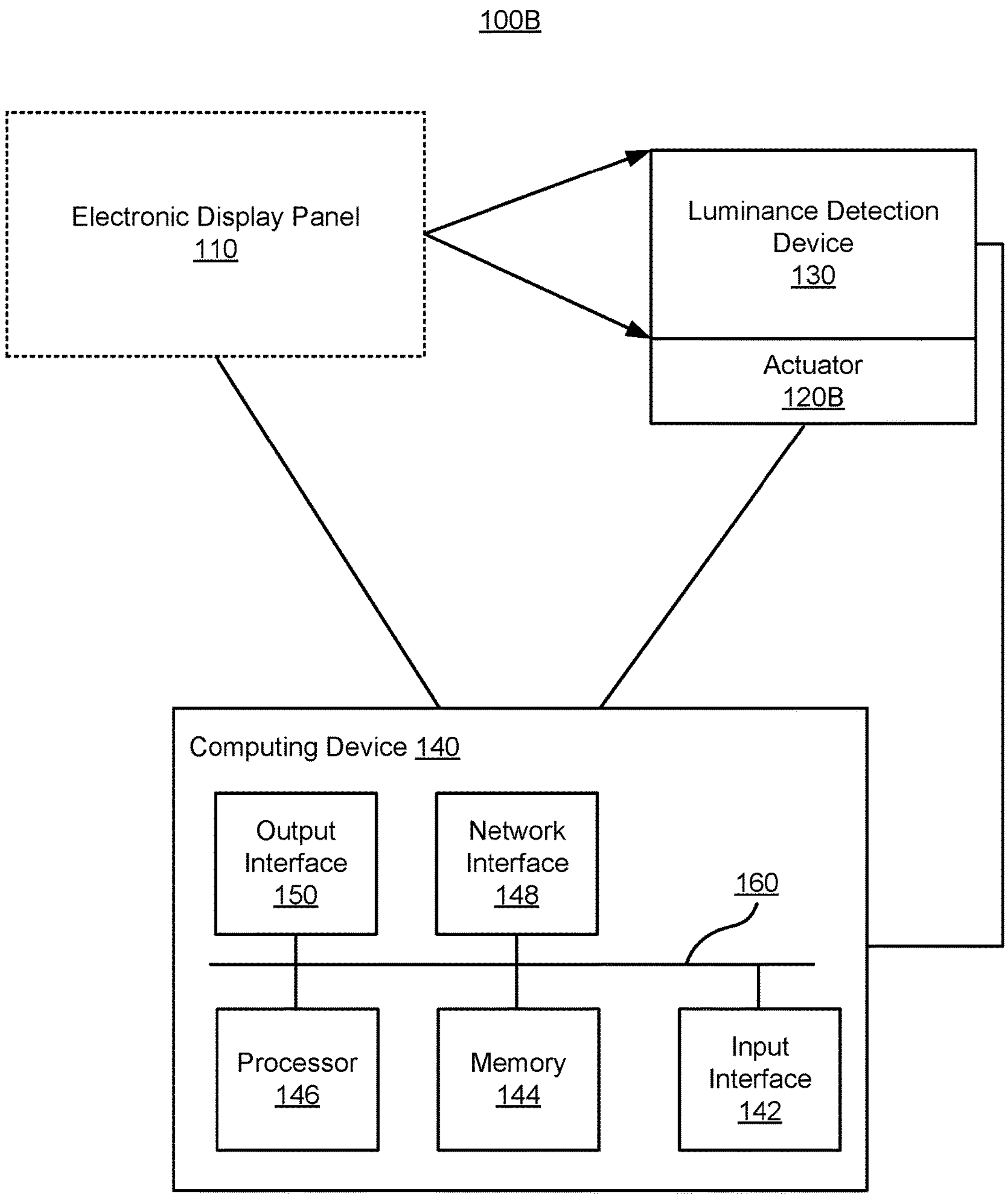
FIG. 1B is a high-level block diagram illustrating an embodiment of a system for calibrating luminance of an electronic display panel, in accordance with another embodiment.

FIG. 1B is high-level block diagrams illustrating a system 100B for calibrating luminance of the electronic display panel 110, in accordance with another embodiment. The embodiment of FIG. 1B differs from the embodiment of FIG. 1A in that an actuator 120B makes translational movement of the luminance detection device 130 in a length direction or a width direction of the electronic display panel 110. The actuator 120B may be placed on various locations coupled to the luminance detection device 130. For example, the actuator 120B may be located proximal to an edge of the luminance detection device 130, underneath the luminance detection device 130, on top of the luminance detection device 130, or some other locations. In some embodiments, the actuator 120B may be coupled to a holder (not shown in FIG. 1B) that holds the luminance detection device 130. In some embodiments, if the luminance detection device 130 extends in the length direction of the electronic display panel 110, the actuator 120B makes translational movement of the luminance detection device 130 in the wide direction of the electronic display panel 110, or vice versa.

The processor 146 generates commands to instruct the actuator 120B to make translational movement of the luminance detection device 130 in a rolling manner such that no two areas in one row or column are below each of the plurality of detectors in the luminance detection device 130, over the same time period, as described above with reference to FIG. 1A except that the luminance detection device 130 is moved instead of the electronic display panel 110.

Examples of Display Panel Calibration using Detector Array Measurement

The luminance detection device 130 may include a plurality of detectors arranged along a width or length of an electronic display panel 110. Examples of the luminance detection device 130 may include one-dimensional detector array, or multiple one-dimensional detector arrays. Each of the plurality of detectors covers an area in the at least one row or column of the electronic display panel 110. In some embodiments, each of the plurality of detectors is a photo-detector. The photo-detector detects light from an area in the electronic display panel 110, and converts light received from the area into voltage or current. Examples of the photo-detector may include a photodiode, a photomultiplier tube (PMT), or a solid state detector. The photo-detector can be coupled with an analog-to-digital converter (ADC) (not shown) to convert voltage analog signals or current analog signals into digital signals for further processing.

Figure 2A:
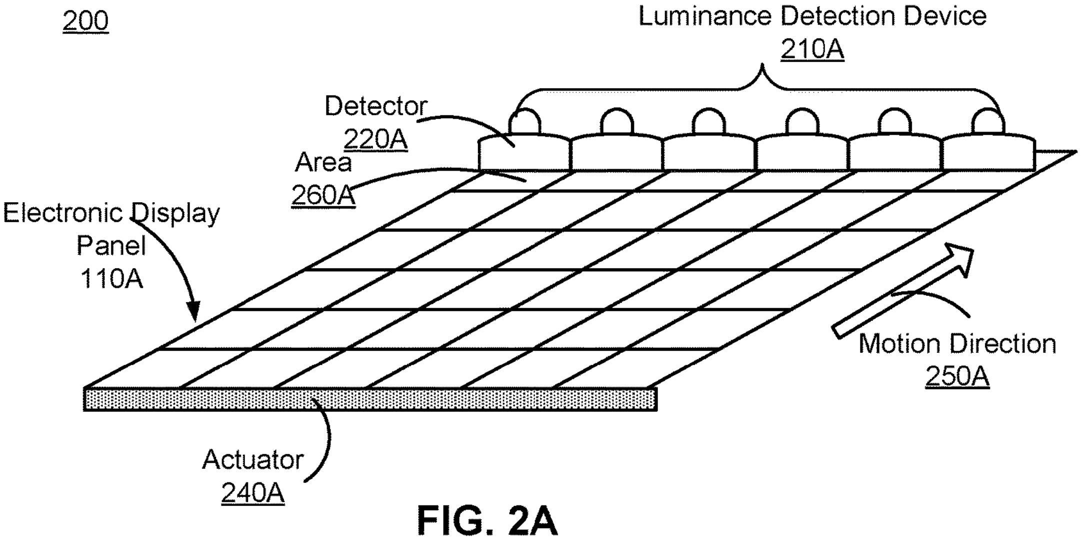
FIG. 2A is a perspective view of a system for calibrating luminance of an electronic display panel using a single one-dimensional detector array, in accordance with an embodiment.
Figure 2B:
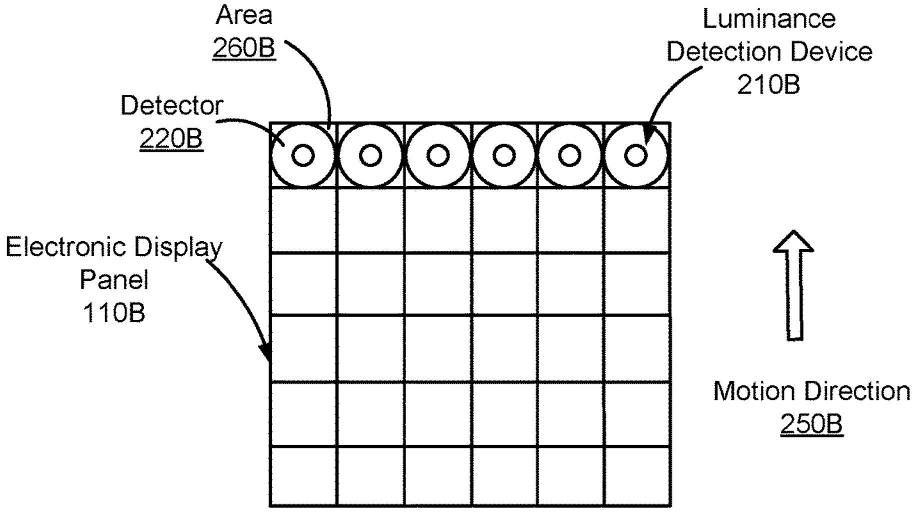
FIG. 2B is a top view of the system illustrated in FIG. 2A, in accordance with an embodiment.
Figure 2C:
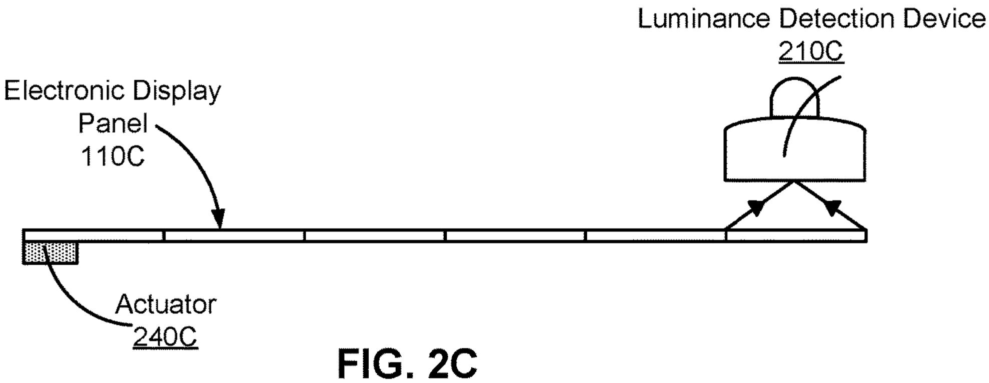
FIG. 2C is a side view of the system illustrated in FIG. 2A, in accordance with an embodiment.

FIG. 2A is a perspective view of a system 200 (a computing device not shown) for calibrating luminance of an electronic display panel 110 using a single one-dimensional detector array 210, in accordance with an embodiment. FIG. 2B is a top view of the system 200 illustrated in FIG. 2A, in accordance with an embodiment. FIG. 2C is a side view of the system 200 illustrated in FIG. 2A, in accordance with an embodiment. An actuator 240 may be an embodiment of the actuator 120A in the system 100A. A luminance detection device 210 may be an embodiment of the luminance detection device 130 in the system 100.

As shown in FIGS. 2A through 2C, the luminance detection device 210 is a one-dimensional detector array having multiple detectors 220 arranged along a width (or a length) of the electronic display panel 110. The size of the one-dimensional detector array is the same as the width (or length) of the electronic display panel 110. Each detector (e.g., detector 220) of the one-dimensional detector array measures luminance parameters of a corresponding area (e.g., area 260) in the row of the electronic display panel 110. The luminance detection device 210 is placed above close to the electronic display panel 110. Such configuration allows each detector of the luminance detection device 210 not to receive light from two distinct areas at the same period of time due to dispersion of light.

In FIG. 2A, the actuator 240 is located proximal to an edge of the electronic display panel 110. Based on commands generated by a computing device (e.g., the computing device 140), the actuator 240 makes translational movement of the electronic display panel 110 along a motion direction 250. The motion direction 250 is orthogonal to a direction (e.g., the width direction of the electronic display panel 110) in which the luminance detection device 210 extends. The actuator 240 fixes the electronic display panel 110 at an initial position where the first row of the electronic display panel 110 is measured by the luminance detection device 210. After a period of time (not shown in FIGS. 2A through 2C), the actuator 240 will make translational movement of the electronic display panel 110 along the motion direction 250 to a next position such that the luminance detection device 210 will measure luminance parameters of the second row of the electronic display panel 110.

In some embodiments, the luminance detection device 130 may include or be combined with an optics block to deliver light from areas of the electronic display panel 110 to the luminance detection device 130. The optics block may include one or more optical elements. Examples of an optical element may include an aperture, a Fresnel lens, a convex lens, a concave lens, a mirror, a beamsplitter, a prism, or an optical filter to collect and deliver light emitted from the electronic display panel 110.

Figure 3A:
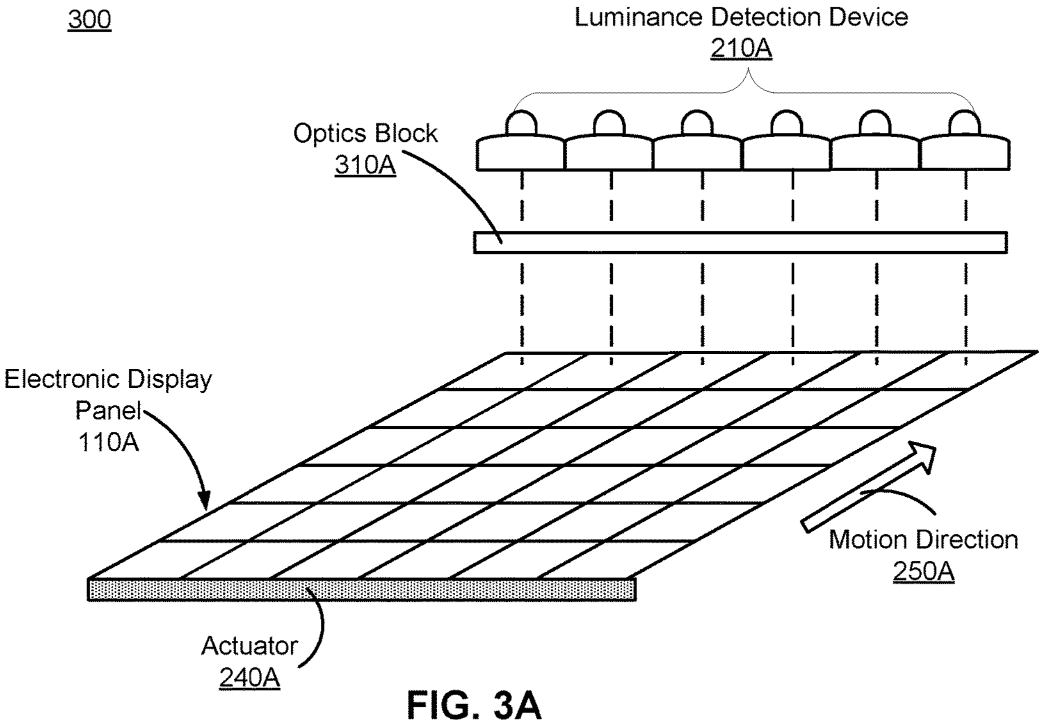
FIG. 3A is a perspective view of a system for calibrating luminance of an electronic display panel using a single one-dimensional detector array combined with an optics block, in accordance with an embodiment.
Figure 3B:
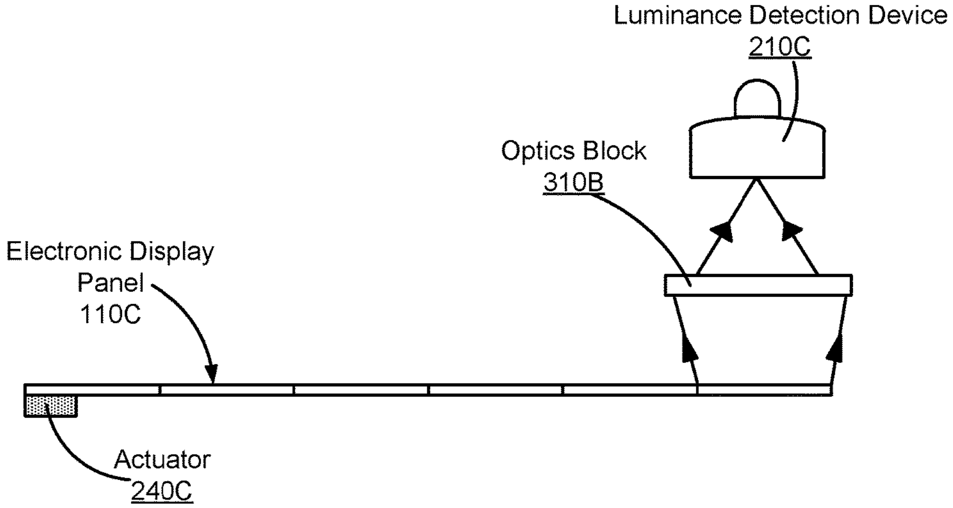
FIG. 3B is a side view of the system illustrated in FIG. 3A, in accordance with an embodiment.

FIG. 3A is a perspective view of a system 300 (a computing device not shown) for calibrating luminance of an electronic display panel 110 using a single one-dimensional detector array 210 combined with an optics block 310, in accordance with an embodiment. FIG. 3B is a side view of the system 300 illustrated in FIG. 3A, in accordance with an embodiment.

As shown in FIGS. 3A through 3B, the optics block 310 is localized between the electronic display panel 110 and the luminance detection device 210. The optics block 310 directs and focuses light emitted from each area to a corresponding detector included in the luminance detection device 210. As such, the optics block 310 allows a space between the luminance detection device 210 and the electronic display panel 110. In such way, the luminance detection device 210 may be located further away from the electronic display panel 110. Additionally, one or more additional optical elements may be placed between the luminance detection device 210 and the electronic display panel 110 for accurate light collections or enhancing signal-to-noise ratio of light collections.

Figure 4A:
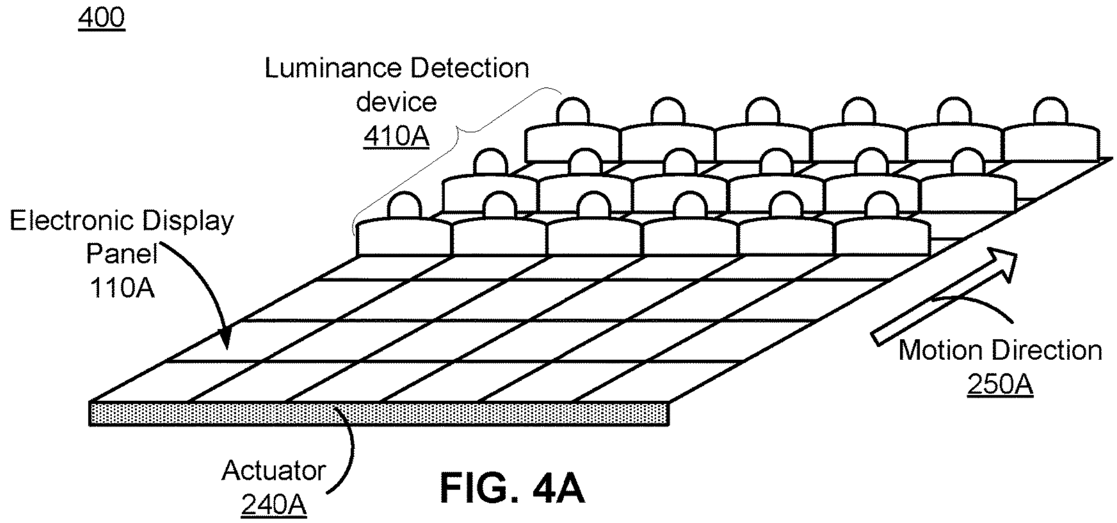
FIG. 4A is a perspective view of a system for calibrating luminance of an electronic display panel using multiple one-dimensional detector arrays, in accordance with an embodiment.
Figure 4B:
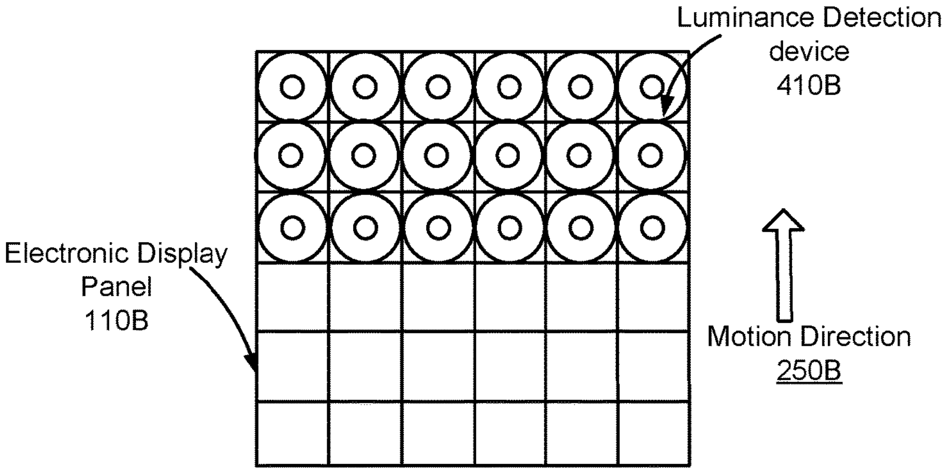
FIG. 4B is a top view of the system illustrated in FIG. 4A, in accordance with an embodiment.
Figure 4C:
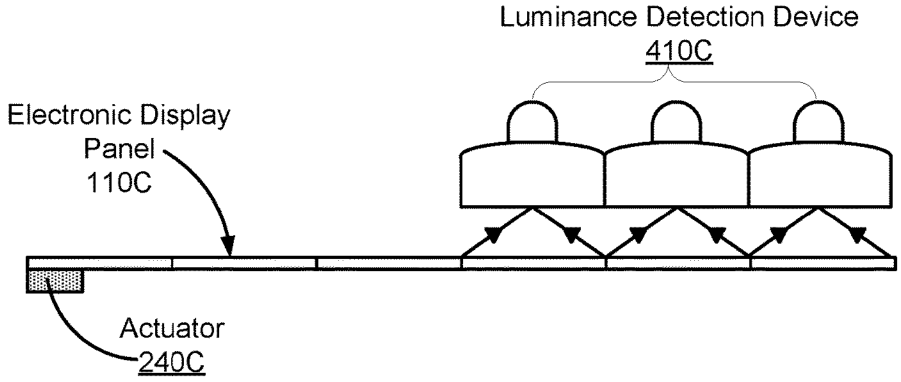
FIG. 4C is a side view of the system illustrated in FIG. 4A, in accordance with an embodiment.

FIG. 4A is a perspective view of a system 400 (a computing device not shown) for calibrating luminance of an electronic display panel 110 using multiple one-dimensional detector arrays 410, in accordance with an embodiment. FIG. 4B is a top view of the system 400 illustrated in FIG. 4A, in accordance with an embodiment. FIG. 4C is a side view of the system 400 illustrated in FIG. 4A, in accordance with an embodiment.

As shown in FIGS. 4A through 4C, the luminance detection device 410 is a two-dimensional detector array including three one-dimensional detector arrays. Each one-dimensional detector array of the luminance detection device is arranged along a width (or a length) of the electronic display panel 110. Each one-dimensional detector array of the two-dimensional detector array measures luminance parameters of one row of areas in the electronic display panel 110. Each detector of each one-dimensional detector array measures luminance parameters of a respective area. The actuator 240 fixes the electronic display panel 110 at an initial position where the first, the second and the third row are measured by the luminance detection device 410. Then, the actuator 240 will cause the electronic display panel 110 to make translational movement in direction 250 to a next position such that the luminance detection device 410 can measure luminance parameters of the fourth, the fifth and the sixth row of the electronic display panel 110.

Alternatively (not shown in FIGS. 4A through 4C), one or more optics blocks may be placed between the luminance detection device 410 and the electronic display panel 110. The one or more optics blocks direct and focus light emitted from each area to a corresponding detector included in the luminance detection device 410.

In some embodiments, not all the one-dimensional detector arrays of the luminance detection device 410 are activated by the computing device to measure luminance parameters. For example (not shown in FIGS. 4A through 4C), if the actuator 240 fixes the electronic display panel 110 at an initial position where the second, the third and the fourth row are measured by the luminance detection device 410. Then the actuator 240 can cause translational movement of the electronic display panel 110 in direction 250 to a next position such that only two one-dimensional detector arrays of the luminance detection device 410 are activated to measure luminance parameters of the fifth and the sixth row. The remaining one-dimensional detector array is not activated by the computing device 140.

In some embodiments, the luminance detection device 130 may include a plurality of band-pass filters. Each of the plurality of band-pass filters is integrated with each of the plurality of one-dimensional detector arrays. Different one-dimensional detector arrays may have different band-pass filters with the same or different predetermined range of wavelengths. Alternatively, each of the plurality of band-pass filters is integrated with each of the plurality of detectors. Different detectors may have different band-pass filters with the same or different predetermined ranges of wavelengths.

Figure 5A:
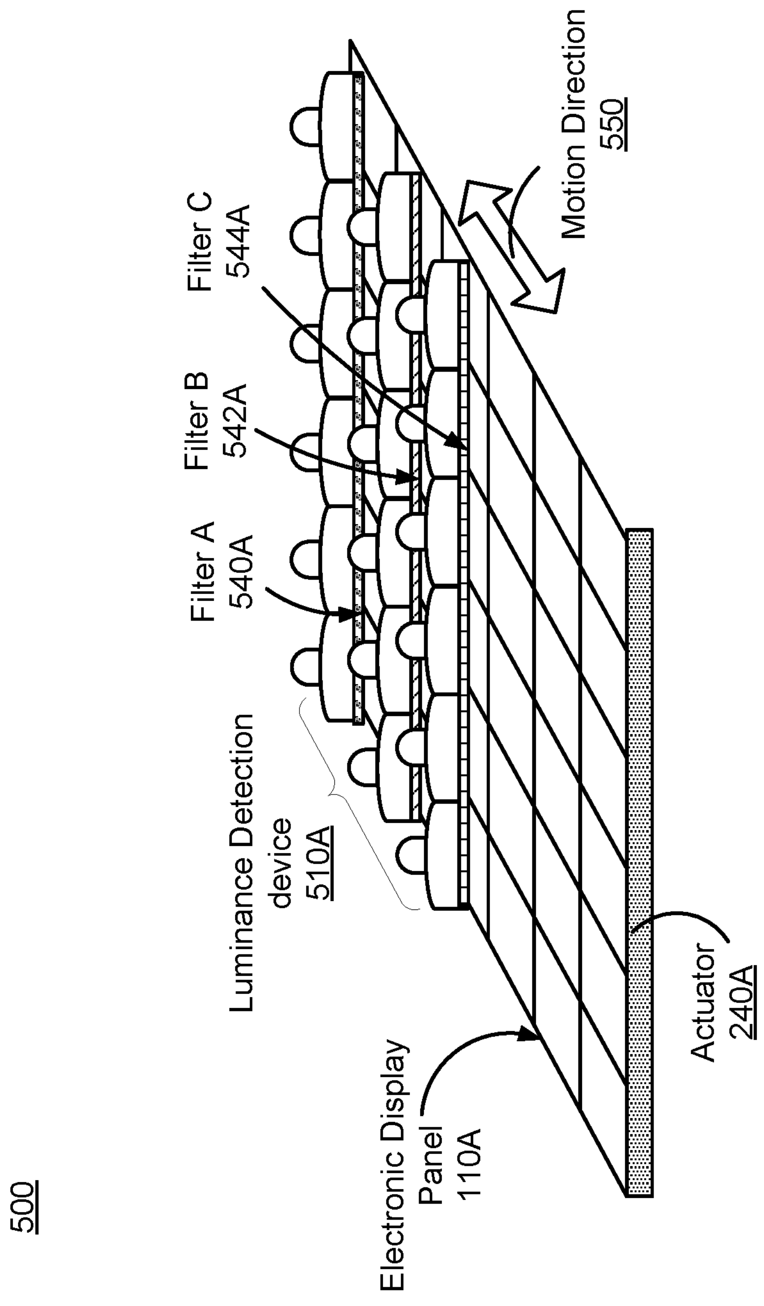
FIG. 5A is a perspective view of a system for calibrating luminance of an electronic display panel using multiple one-dimensional detector arrays each having a filter, in accordance with an embodiment.

FIG. 5A is a perspective view of a system 500 (a computing device not shown) for calibrating luminance of an electronic display panel 110 using multiple one-dimensional detector arrays 510 each having a filter, in accordance with an embodiment. The filters (e.g., a filter A 540, a filter B 542, and a filter C 544) may be optical filters. As shown in FIG. 5A, the luminance detection device 510 includes three one-dimensional detector arrays each integrated with a respective filter (e.g., a filter A 540, a filter B 542, and a filter C 544). The luminance detection device 510 is close to the electronic display panel 110. Alternatively (not shown in FIGS. 5A-5B), one or more optics blocks may be placed between the luminance detection device 510 and the electronic display panel 110. The actuator 240 causes the electronic display panel 110 to make translational movement along a motion direction 550 such that the luminance detection device 510 can measure the same row using different one-dimensional detector arrays integrated with different filters.

FIGS. 5B through 5E are side views of the system 500 illustrated in FIG. 5A illustrating examples of measuring the same areas using different one-dimensional detector arrays integrated with different filters, in accordance with an embodiment. A computing device (not shown in FIGS. 5B through 5E) generates commands to sequentially activate each one-dimensional detector array to measure luminance parameters from the same areas. The computing device also generates commands to make translational movement of the electronic display panel 110 in a rolling manner.

Figure 5B:
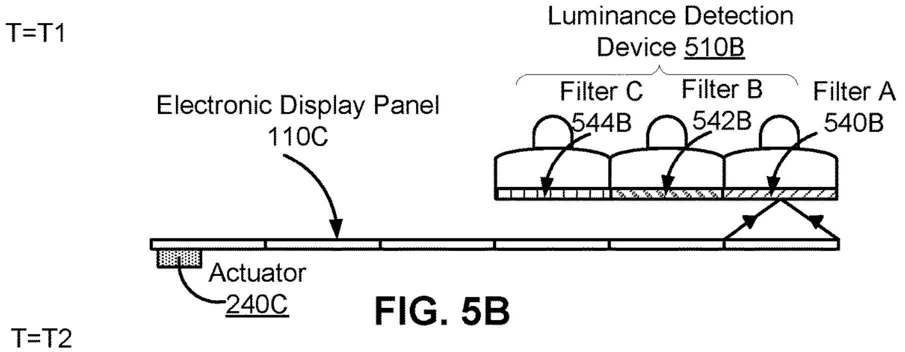
FIGS. 5B through 5E are side views of the system illustrated in FIG. 5A, illustrating examples of measuring the same areas using different one-dimensional detector arrays integrated with different filters, in accordance with an embodiment.
Figure 5C:
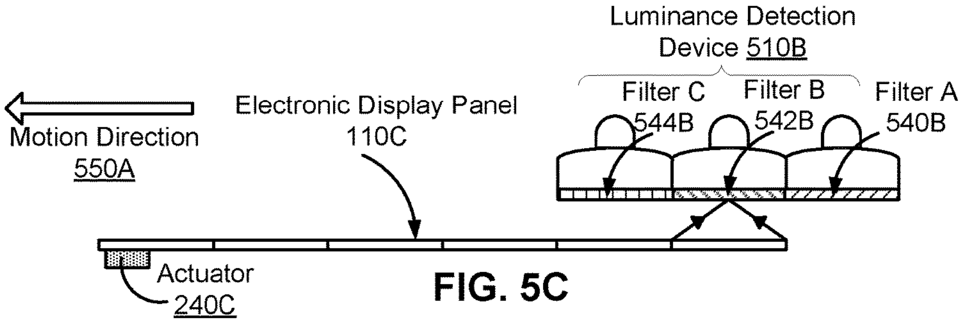
Figure 5D:
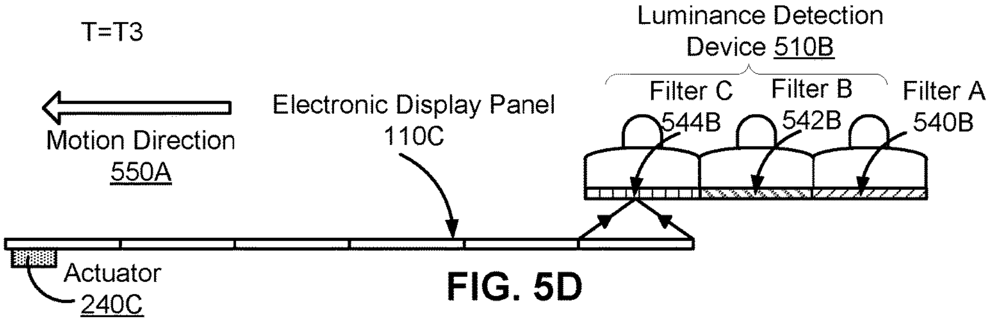
Figure 5E:
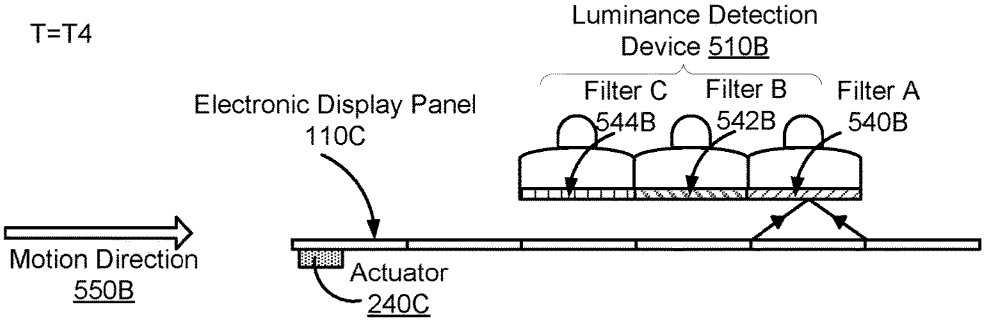

As shown in FIG. 5B, during a period of time T1, the actuator 240 fixes a first row of the electronic display panel 110 at a first position. The computing device generates commands to activate a first one-dimensional detector array integrated with the filter A 540, and generates commands to de-activate the remaining one-dimensional detector arrays. The first one-dimensional detector array measures luminance parameters of the first row at the first position. After T1, as shown in FIG. 5C, the actuator 240 causes translational movement of the electronic display panel 110 in the motion direction 550A to a second position such that the second one-dimensional detector array integrated with filter B 542 measures luminance parameters of the same row during a period of time T2. After T2, as shown in FIG. 5D, the actuator 240 causes translational movement of the electronic display panel 110 along the motion direction 550A to a third position such that the third one-dimensional detector array integrated with the filter C 544 measures luminance parameters of the same row during a period of time T3. This process is repeated for a next row in the electronic display panel 110. As such, the luminance detection device 510 can measure the same row using different one-dimensional detector arrays integrated with different filters for calibration (e.g., the filter A 540 is a red color filter, the filter B 542 is a green color filter, and the filter C 544 is a blue color filter).

In some embodiments, the plurality of band-pass filters are mounted on a filter wheel. By rotating the filter wheel, one of the plurality of band-pass filters passes light with a predetermined range of wavelengths, and the light is detected by corresponding detectors. In some embodiments, the filter wheel is integrated with one of the plurality of one-dimensional detector arrays.

Figure 6A:
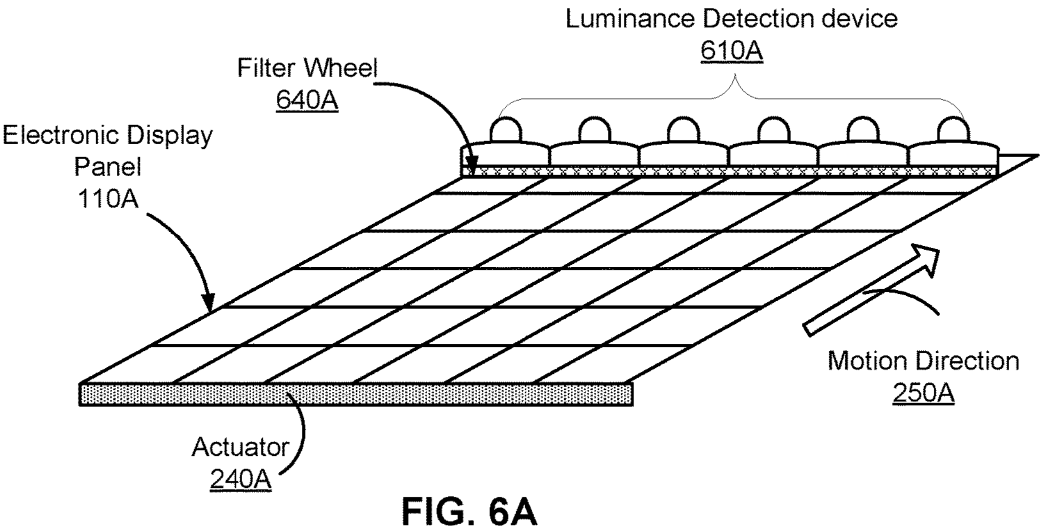
FIG. 6A is a perspective view of a system for calibrating luminance of an electronic display panel using a single one-dimensional detector array having a filter wheel, in accordance with an embodiment.
Figure 6B:
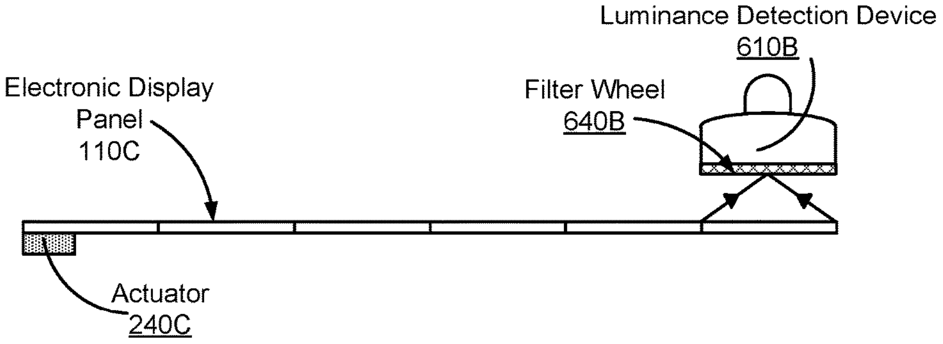
FIG. 6B is a side view of the system illustrated in FIG. 6A, in accordance with an embodiment.

FIG. 6A is a perspective view of a system 600 for calibrating luminance of an electronic display panel 110 using a single one-dimensional detector array 610 having a filter wheel 640, in accordance with an embodiment. FIG. 6B is a side view of the system 600 illustrated in FIG. 6A, in accordance with an embodiment.

The filter wheel 640 may include the plurality of band-filters shown in FIGS. 5A through 5E. The luminance detection device 610 is a one-dimensional detector array having a filter wheel 640. The luminance detection device 610 is placed close to the electronic display panel 110. Alternatively (not shown in FIGS. 6A through 6B), an optics block may be placed between the luminance detection device 610 and the electronic display panel 110. The actuator 240 makes translational movement of the electronic display panel 110 along the motion direction 250. The actuator 240 fixes the electronic display panel 110 at an initial position such that the luminance detection device 610 measures the first row of the electronic display panel 110 for a period of time. During the period of time, a computing device (not shown in FIGS. 6A through 6B) generates commands to rotate the filter wheel 640 such that a filter is selected for measuring luminance parameters of each area in the first row. In some embodiments, the filter wheel 640 may be rotated manually. By rotating the filter wheel 640, a single one-dimensional detector array is able to measure the same areas using different filters without moving the electronic display panel 110 described in FIGS. 5B through 5E. As such, translating the electronic display panel process is simplified for fast acquisition.

Figure 7:
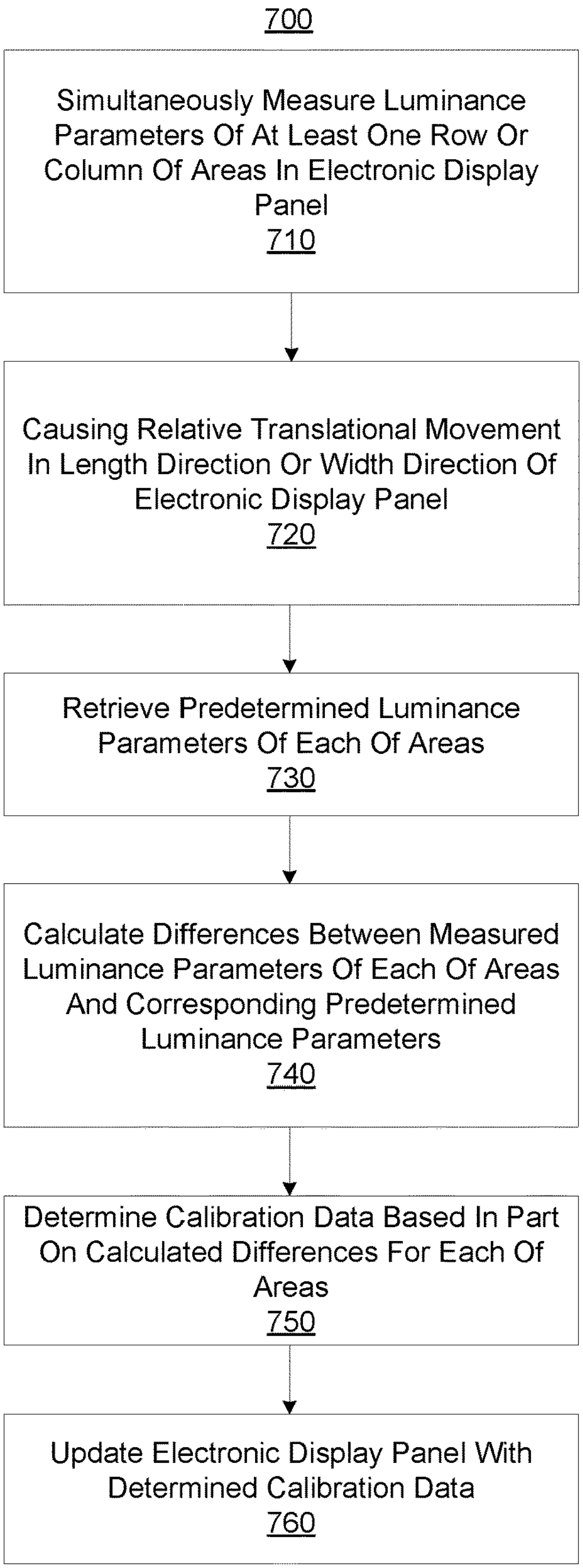
FIG. 7 is a flowchart illustrating a process for calibrating luminance of an electronic display, in accordance with an embodiment.

FIG. 7 is a flowchart illustrating a process 700 for calibrating luminance of an electronic display, in accordance with an embodiment. The process 700 may be performed by the system 100 in some embodiments. Alternatively, other components may perform some or all of the steps of the process 700. Additionally, the process 700 may include different or additional steps than those described in conjunction with FIG. 7 in some embodiments or perform steps in different orders than the order described in conjunction with FIG. 7.

The system 100 simultaneously measures 710 luminance parameters of at least one row or column of areas in an electronic display panel 110. Examples of an area may include a pixel, a sub-pixel, a group of sub-pixels, or a group of pixels. Examples of the luminance parameters associated with the area may include a brightness level, a color value, or both. In some embodiments, the luminance detection device 130 is a one-dimensional detector array to measure luminance parameters of one row or column of areas in the electronic display panel 110. Examples are described above with respect to FIGS. 2A, 2B, 2C, 3A, 3B, 6A and 6B. Alternatively, the luminance detection device 130 is a two-dimensional detector array that includes multiple one-dimensional detector arrays to measure luminance parameters of multiple rows or columns of areas in the electronic display panel. Examples are described above with respect to FIGS. 4A through 5E.

The system 100 causes 720 a relative translational movement in a length direction or a width direction of the electronic display panel 110. The relative translational movement is in a direction that is orthogonal to a direction in which the luminance detection device 130 extends. For example, the system 100 instructs the actuator 120A to make translational movement of the electronic display panel 110 in a length direction or a width direction of the electronic display panel 110. An example is described above with respect to FIG. 1A. In another example, the system 100 instructs the actuator 120B to make translational movement of the luminance detection device 130 in a length direction or a width direction of the electronic display panel. An example is described above with respect to FIG. 1B.

The system 100 retrieves 730 predetermined luminance parameters of each of the areas. For example, the system 100 retrieves a predetermined brightness level, or a predetermined color value, or both of the area that has been measured by the luminance detection device 130.

The system 100 calculates 740 differences between the measured luminance parameters of each of the areas and corresponding predetermined luminance parameters. In some embodiments, the system 100 may determine a luminance quality to check if differences between calibrated luminance parameters of the areas and corresponding predetermined luminance parameters are within the acceptable ranges.

The system 100 determines 750 the calibration data based in part on the calculated differences for each of the areas. For example, the system 100 determines calibration data to adjust the measured luminance parameters of the area such that the corresponding calibrated luminance parameters of the area are within the acceptable ranges. In another example, if the determined luminance quality indicates that a deviation of the measured luminance parameters of an area relative to corresponding predetermined luminance parameters are less than an associated threshold, the system 100 determines the calibration data based on calculated differences. For example, compared with the predetermined brightness level, the measured brightness level is outside of a range of brightness level. Compared with the predetermined color value, the measured color value is outside of a range of colors values. If the determined luminance quality indicates that a difference between the measured luminance parameters of an area with corresponding predetermined luminance parameters is within an acceptable range, the system 100 determines the calibration data that is the same as original data for driving the area. In such way, the system 100 may determine calibration data for all the pixels. In some embodiments, the system 100 may skip the step for determining the calibration data. In such way, the system 100 determines calibration data for portions of the area included in the electronic display panel.

The system 100 updates 760 the electronic display panel 110 with the determined calibration data. For example, the system 100 generates instructions to instruct the electronic display panel 110 to display the areas based on the calibration data.

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

The language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights.

What is claimed is:

1. A system comprising:

a luminance detection device comprising a plurality of detectors arranged along a width or length of an electronic display panel to simultaneously measure luminance parameters of at least one row or column of areas in the electronic display panel, each of the plurality of detectors covering an area in the at least one row or column of the electronic display panel;

an actuator configured to cause a relative translational movement in a length direction or a width direction of the electronic display panel; and a computing device coupled to the luminance detection device to receive the measured luminance parameters, the computing device configured to generate calibration data for adjusting brightness of areas of the electronic display panel by processing the measured luminance parameters.

2. The system of claim 1, wherein each of the plurality of detectors is a photodiode.

3. The system of claim 1, wherein the area includes a group of pixels of the electronic display panel.

4. The system of claim 1, wherein the relative translational movement is in a direction that is orthogonal to a direction in which the luminance detection device extends.

5. The system of claim 1, wherein the luminance detection device comprises a plurality of one-dimensional detector arrays, each one-dimensional detector array configured to measure luminance parameters of one row or column of areas in the electronic display panel.

6. The system of claim 5, wherein the luminance detection device further comprises a plurality of band-pass filters between the electronic display panel and sensors of the luminance detection device, each band-pass filter configured to pass light within a predetermined range of wavelengths.

7. The system of claim 6, wherein each band-pass filter is integrated with each of the plurality of one-dimensional detector arrays.

8. The system of claim 6, wherein the plurality of band-pass filters comprises a first band-pass filter configured to pass red light, a second band-pass filter configured to pass green light, and a third band-pass filter configured to pass blue light.

9. The system of claim 6, wherein the plurality of band-pass filters are mounted on a filter wheel.

10. The system of claim 9, wherein the filter wheel is integrated with one of the plurality of one-dimensional detector arrays.

11. The system of claim 1, further comprising an optics block configured to deliver light to the luminance detection device.

12. The system of claim 1, wherein the computing device is further configured to perform a control operation of the actuator.

13. The system of claim 1, wherein the computing device is further configured to update the electronic display panel with the generated calibration data.

14. The system of claim 1, wherein the calibration data further includes a color adjustment to one or more of the areas of the electronic display panel.

15. The system of claim 1, wherein the computing device is further configured to:

retrieve predetermined luminance parameters of each of the areas;

calculate differences between the measured luminance parameters of each of the areas and corresponding predetermined luminance parameters; and determine the calibration data based in part on the calculated differences for each of the areas.

16. The system of claim 15, wherein the computing device is further configured to:

determine a luminance quality based in part on the calculated differences, the luminance quality representing how close the measured luminance parameters of each of the areas are to the corresponding predetermined luminance parameters.

17. The system of claim 16, wherein the computing device is further configured to:

determine the calibration data based on the calculated differences, responsive to the determined luminance quality indicating that a deviation of the measured luminance parameters of the areas relative to corresponding predetermined luminance parameters are less than an associated threshold.

18. A method comprising:

simultaneously measuring luminance parameters of at least one row or column of areas in an electronic display panel using a luminance detection device comprising a plurality of detectors arranged along a width or length of the electronic display panel, each of the plurality of detectors covering an area in the at least one row or column of the electronic display panel;

causing a relative translational movement in a length direction or a width direction of the electronic display panel; and generating calibration data for adjusting brightness of areas of the electronic display panel based in part on the measured luminance parameters.

19. The method of claim 18, further comprising updating the electronic display panel with the generated calibration data.

20. The method of claim 18, wherein the generating calibration data for adjusting brightness of areas of the electronic display panel based in part on the measured luminance parameters comprises:

retrieving predetermined luminance parameters of each of the areas;

calculating differences between the measured luminance parameters of each of the areas and corresponding predetermined luminance parameters; and determining the calibration data based in part on the calculated differences for each of the areas.

* * * * *